(12) United States Patent
Suhling

(10) Patent No.: US 10,836,066 B2
(45) Date of Patent: Nov. 17, 2020

(54) ZERO CLEARANCE FENCE

(71) Applicant: Robert James Suhling, Waukegan, IL (US)

(72) Inventor: Robert James Suhling, Waukegan, IL (US)

( * ) Notice: Subject to any disclaimer, the term of this patent is extended or adjusted under 35 U.S.C. 154(b) by 159 days.

(21) Appl. No.: 16/023,839

(22) Filed: Jun. 29, 2018

(65) Prior Publication Data

US 2020/0001495 A1  Jan. 2, 2020

(51) Int. Cl.
*B27B 27/04* (2006.01)
*B27B 27/08* (2006.01)
*B23D 45/04* (2006.01)

(52) U.S. Cl.
CPC ............ *B27B 27/04* (2013.01); *B23D 45/044* (2013.01); *B27B 27/08* (2013.01)

(58) Field of Classification Search
CPC .. B25B 1/00; B25B 5/07; B25B 5/145; B27B 27/00; B27B 27/04; B27B 27/06; B27B 27/08; B27B 27/10
USPC ................................ 269/309, 313, 314, 315
See application file for complete search history.

(56) References Cited

U.S. PATENT DOCUMENTS

| | | | |
|---|---|---|---|
| 5,359,824 A * | 11/1994 | Koberstein | E04C 2/428 411/148 |
| 8,463,765 B2 | 6/2013 | Lesavich | |
| 8,661,956 B2 * | 3/2014 | Thomas | B23D 45/044 83/471.3 |
| 9,037,564 B2 | 5/2015 | Lesavich et al. | |
| 9,137,250 B2 | 9/2015 | Lesavich et al. | |
| 9,361,479 B2 | 6/2016 | Lesavich et al. | |
| 9,545,734 B2 | 1/2017 | Suhling | |
| 9,569,771 B2 | 2/2017 | Lesavich et al. | |
| 9,616,587 B2 * | 4/2017 | Xu | B27B 27/04 |
| 9,682,454 B2 | 6/2017 | Suhling | |
| 10,022,887 B2 * | 7/2018 | Hogenhout | B27B 27/08 |
| 10,245,653 B2 | 4/2019 | Suhling | |
| 10,336,127 B1 | 7/2019 | Suhling | |
| 10,661,457 B2 * | 5/2020 | France | B26B 1/048 |
| 2008/0053283 A1 * | 3/2008 | Lin | B27B 27/04 83/440 |

(Continued)

OTHER PUBLICATIONS

"Ferstler" Nov. 10, 2013, Modified Ridgid 12-inch sliding Miter saw, Lumberjocks.com, https://web.archive.org/web/20150618015401/http://lumberjocks.com/topics/54817.*

(Continued)

*Primary Examiner* — Lee D Wilson
*Assistant Examiner* — Seahee Hong
(74) *Attorney, Agent, or Firm* — Lesavich-High-Tech Law Group, S.C.

(57) ABSTRACT

A Zero Clearance Fence that gives precision to chop saw fences. The invention consists of two flat surfaces and mounting devices. The flat surfaces are beveled at one edge of both surfaces. The beveled edge allows a tape measure to be hooked on at any desired miter angle. The invention mounts onto the original chop saw fences so that they are able to slide towards and away from the saw blade. The ability to slide allows the fences to always be right next to the saw blade at any miter angle cut for precision in the cut measurements. The mounting apertures can be located anywhere to allow the Zero Clearance Fence to fit on any chop saw.

4 Claims, 23 Drawing Sheets

(56) References Cited

U.S. PATENT DOCUMENTS

| | | |
|---|---|---|
| 2009/0095141 A1* | 4/2009 | Billings .............. B27B 27/06 |
| | | 83/468.3 |
| 2011/0208710 A1 | 8/2011 | Lesavich |
| 2012/0278622 A1 | 11/2012 | Lesavich et al. |
| 2014/0189792 A1 | 7/2014 | Lesavich et al. |
| 2015/0298273 A1 | 10/2015 | Suhling |
| 2015/0306784 A1 | 10/2015 | Suhling |
| 2015/0379301 A1 | 12/2015 | Lesavich et al. |
| 2016/0321654 A1 | 11/2016 | Lesavich et al. |
| 2018/0043439 A1 | 2/2018 | Suhling |
| 2019/0381614 A1 | 12/2019 | Suhling |
| 2019/0389500 A1 | 12/2019 | Suhling |
| 2020/0001495 A1 | 1/2020 | Suhling |

OTHER PUBLICATIONS

"GarageSandals" Feb. 5, 2013, Flickr, https://www.flickr.com/photos/garagesandals/8451506618/.*

Mitre Saw Mitre Cutting Jig, Jul. 25, 2013, (https://www.youtube.com/watch?v=gQK4LbmEYh4), hereinafter MSMCJ.*

* cited by examiner

ZERO CLEARANCE FENCE

CROSS-REFERENCE TO RELATED APPLICATION (not applicable)

STATEMENT REGARDING FEDERALLY SPONSORED RESEARCH OR DEVELOPMENT (not applicable)

NAMES OF PARTIES TO A JOINT RESEARCH AGREEMENT (not applicable)

REFERENCE TO SEQUENCE LISTING, A TABLE OR A COMPUTER PROGRAM LISTING COMPACT DISC APPENDIX (not applicable)

FIELD OF THE INVENTION

The present invention relates generally to chop saw fences, and more specifically, it relates to extensions that, can be mounted onto existing chop saw fences to increase the accuracy of any angle of miter cut and decreasing the time to measure any angle of miter cut.

DESCRIPTION OF THE PRIOR ART

Every chop saw has two fences that are located on either, side of the saw blade. They are triangular in shape in order to allow room for the saw to rotate for a bevel cut. They are also able to slide towards and away from the blade for when the user wants a miter cut. Once the fence is in position, the user can lock them in place with a tightener on the back.

The main problem with the prior art is the inability to get an accurate measurement from the fences because of their shape.

This is especially true when performing a miter cut on an existing chop saw. Most chop saws have plastic inserts that guide a work piece to be cut. because you aren't able to measure from a plastic insert either due to the angle between the plastic insert and a work piece. Another problem is the reduced area of work support that is a result of the triangular shape of the fence.

There are guides out there that, tell the user to drill and mount a block of wood onto an existing chop saw fence so that when you cut into it, the block of wood will be zero clearance to the saw blade.

The main problem with said prior art is that there is no back-cut, so it is hard to get an accurate measurement when cutting a miter. Another problem is that the wood blocks have to be thick in order to provide enough support, to the work piece. This reduces the amount of cutting space available.

BRIEF SUMMARY OF THE INVENTION

A primary object of the present invention is to provide a chop saw fence extension that will overcome the shortcomings of the prior art devices.

Another object is to provide a chop saw fence extension that provides a precise edge for measuring a 90-degree cut and can adjust for any angle of miter cut.

Another object is to provide a chop saw fence extension that provides the maximum amount of work support for a 90-degree cut and can adjust for any angle of miter cut.

Another object is to provide a chop saw fence extension that allows the work piece to slide along the fence unhindered.

Another object is to provide a chop saw fence extension that has a thin cross-section to keep the cutting area as deep as possible.

Another object is to provide a chop saw fence extension that does not damage the saw blade if the blade accidentally hits the chop saw fence.

Another object is to provide a chop saw fence extension that is durable enough for everyday outside use.

Another object is to provide a chop saw fence extension that a tape measure can easily hook onto for any miter angle.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE SEVERAL VIEWS OF THE DRAWINGS

FIG. 16 is an upper perspective view of the present invention mounted on an existing chop saw in a right miter position.

REFERENCE NUMERALS

Figure 1:
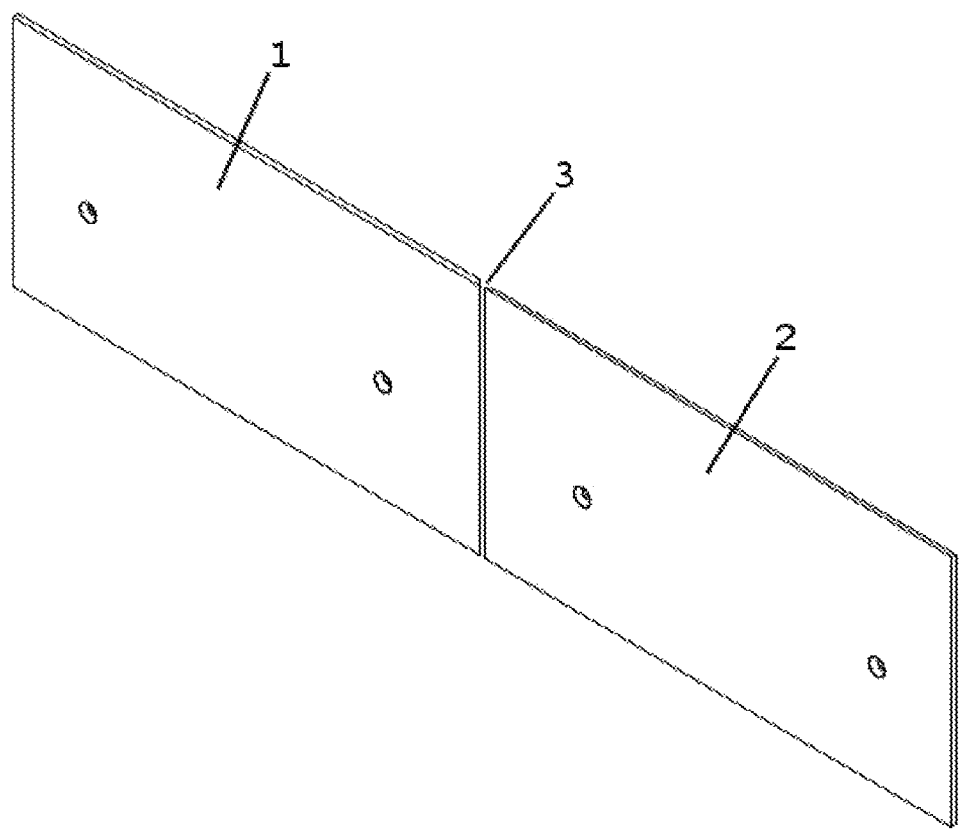
FIG. 1 is an upper perspective view of the present invention.
Figure 2:
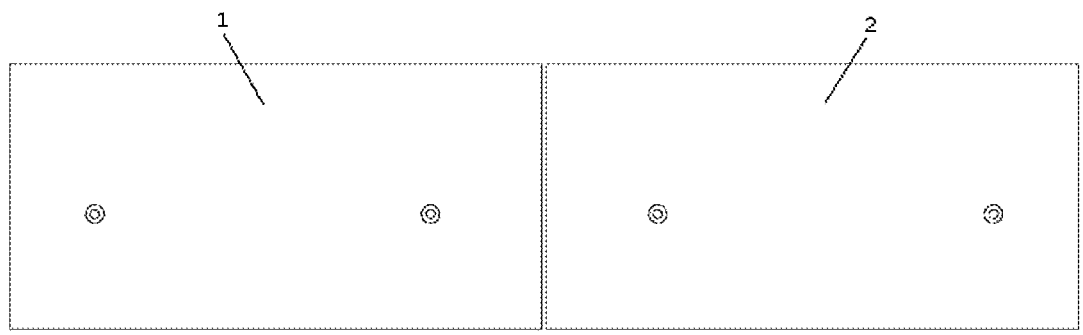
FIG. 2 is a front view of the present invention.
Figure 3:
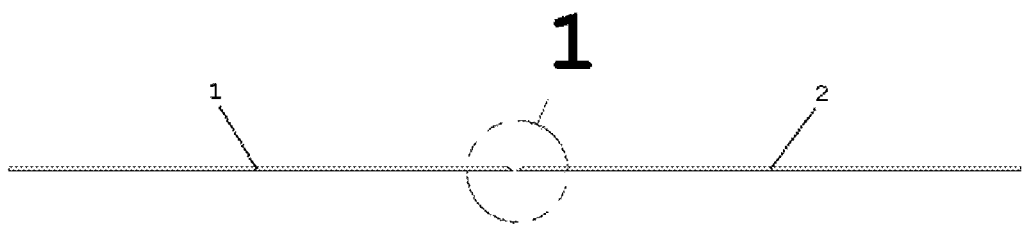
FIG. 3 is a top view of the present invention.
Figure 4:
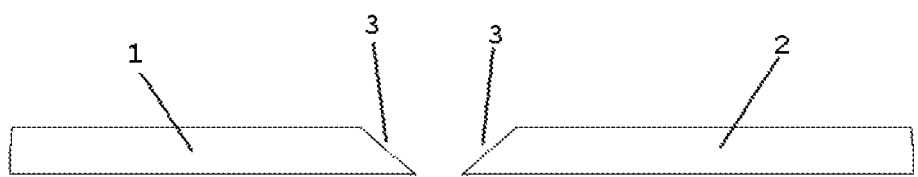
FIG. 4 is a magnified view taken from circle 1 of FIG. 3.
Figure 5:
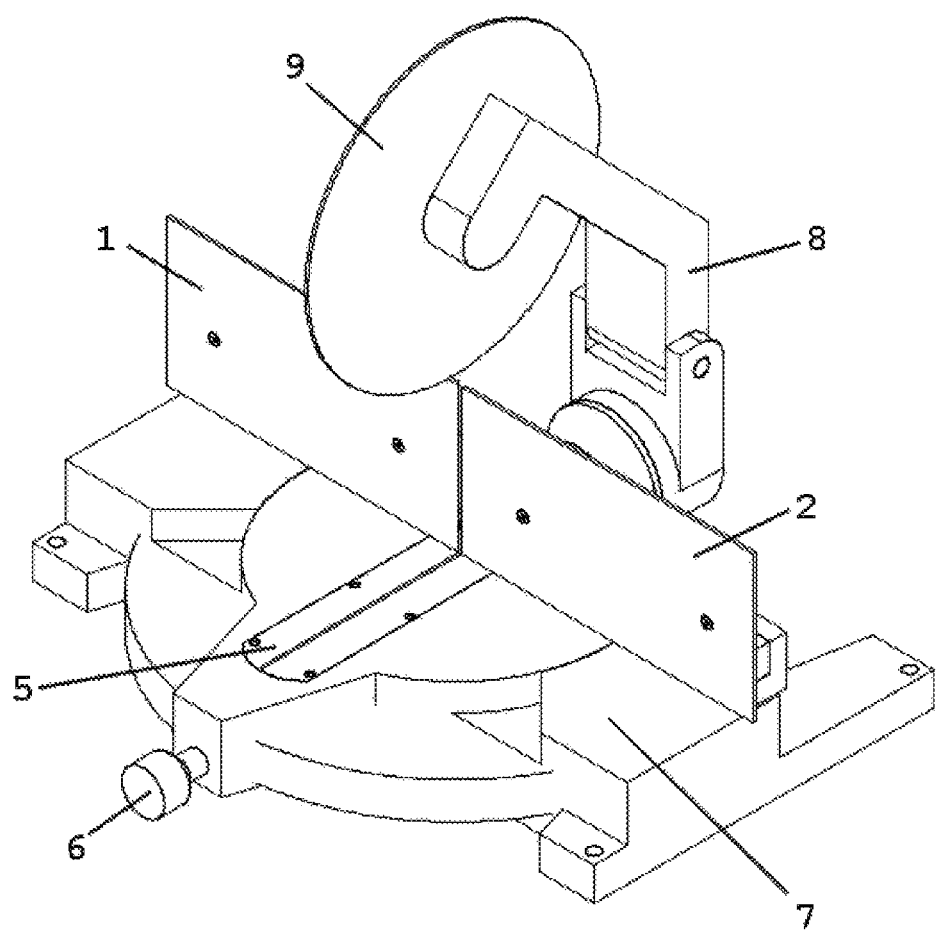
FIG. 5 is an upper perspective view of the present invention mounted on an existing chop saw.
Figure 6:
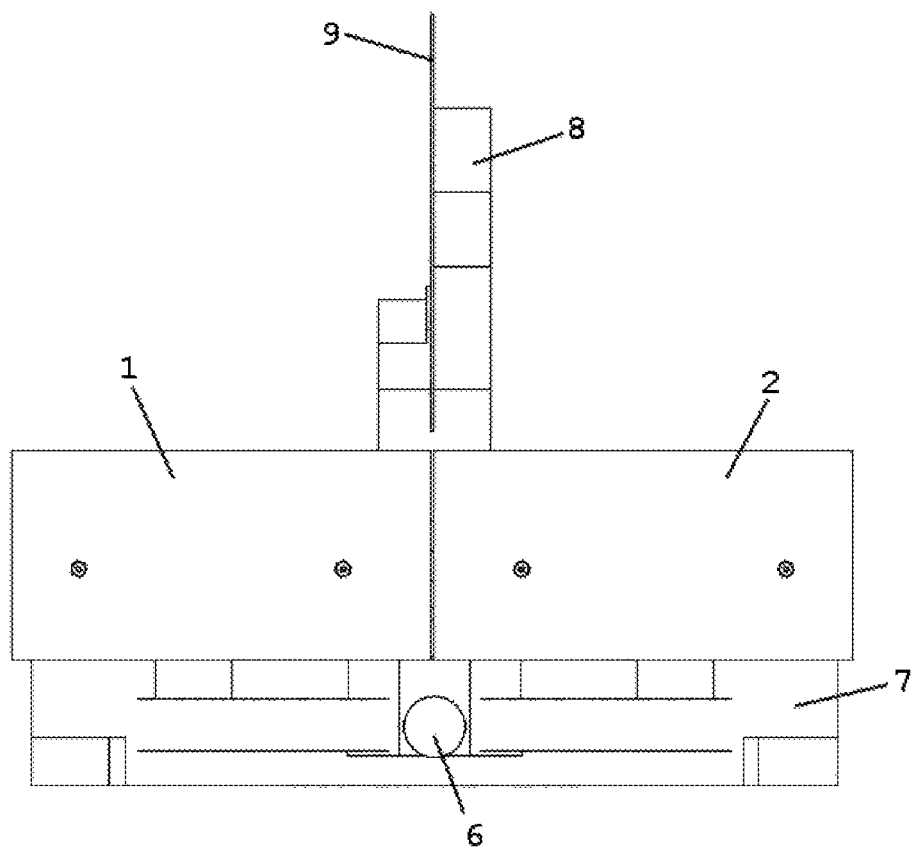
FIG. 6 is a front view of the present invention mounted on an existing chop saw.
Figure 7:
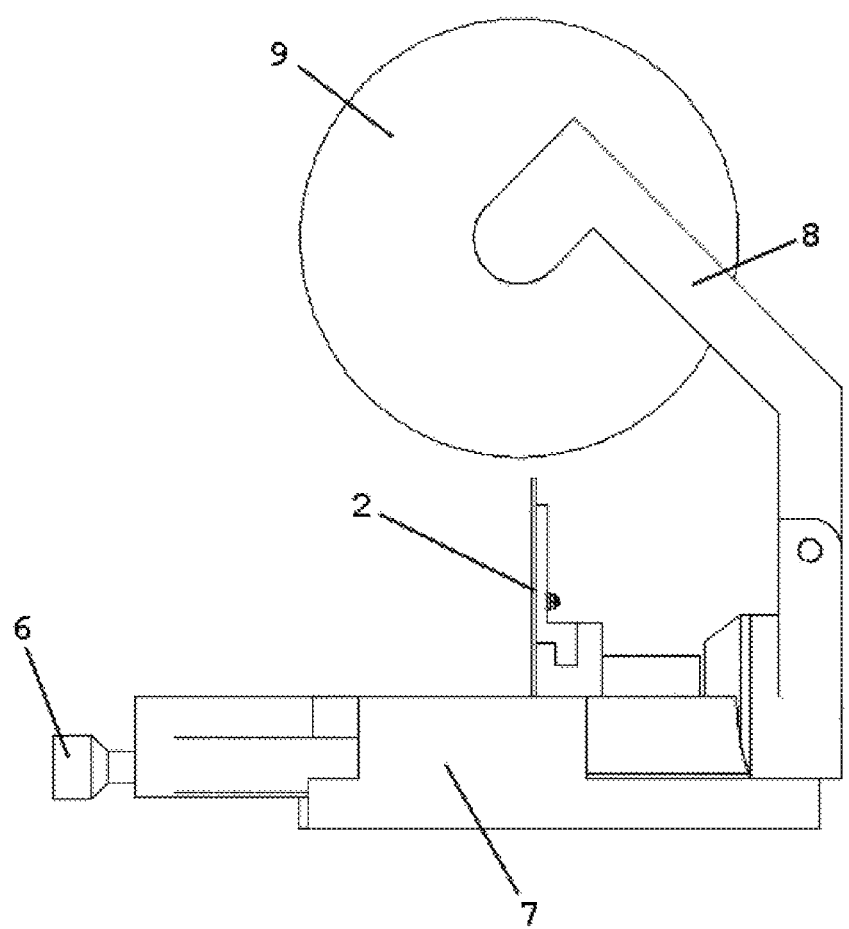
FIG. 7 is a side view of the present invention mounted on an existing chop saw.
Figure 8:
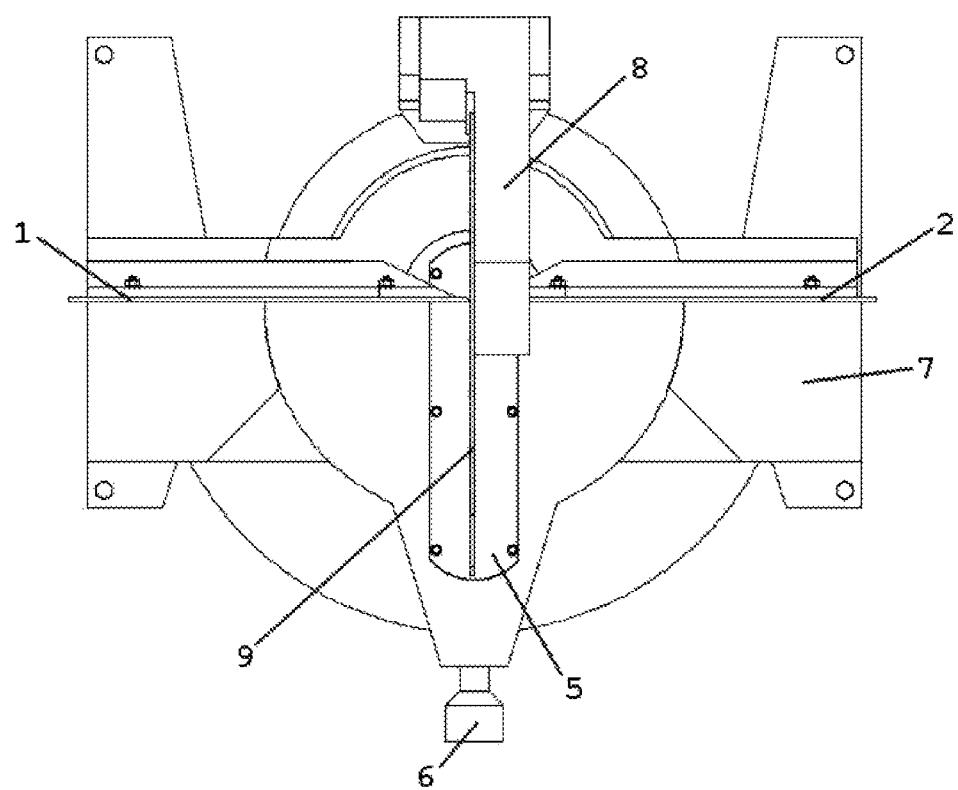
FIG. 8 is a top view of the present invention mounted on an existing chop saw.
Figure 9:
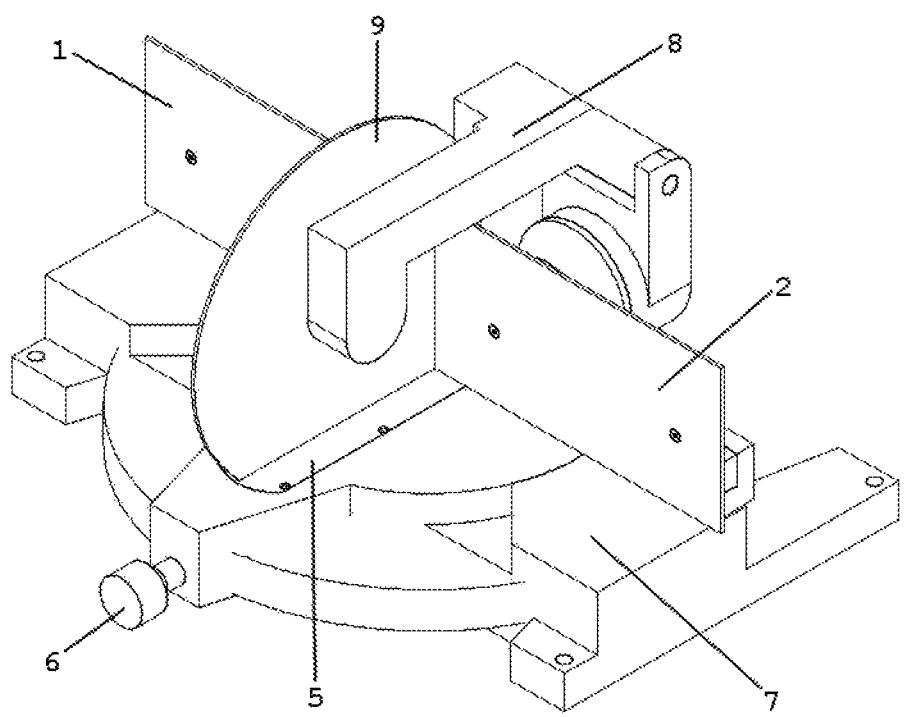
FIG. 9 is an upper perspective view of the present invention mounted on an existing chop saw in the down position.
Figure 10:
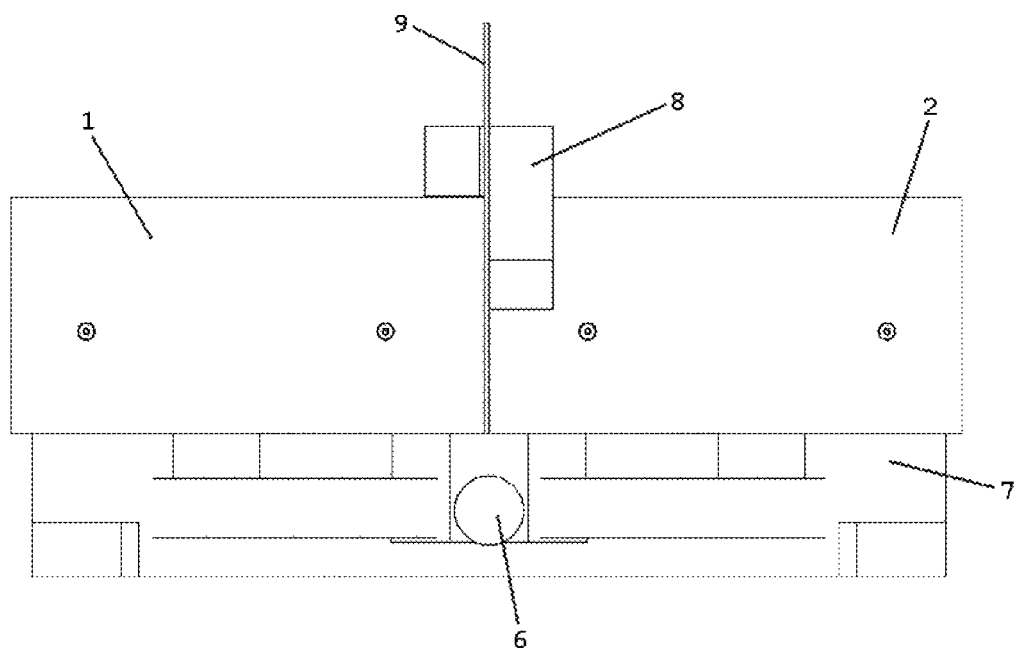
FIG. 10 is a front view of the present invention mounted on an existing chop saw in the down position.
Figure 11:
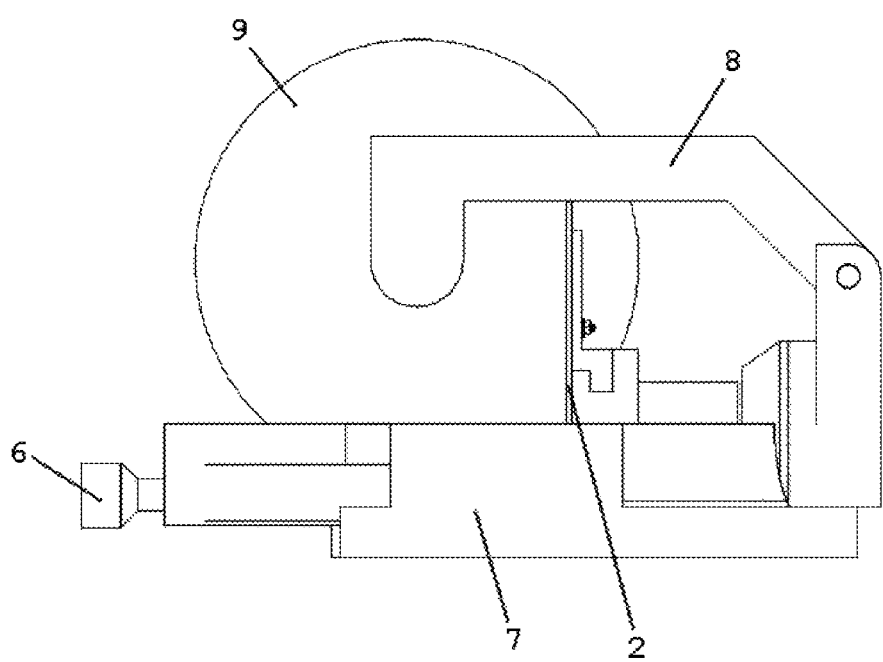
FIG. 11 is a side view of the present invention mounted on an existing chop saw in the down position.
Figure 12:
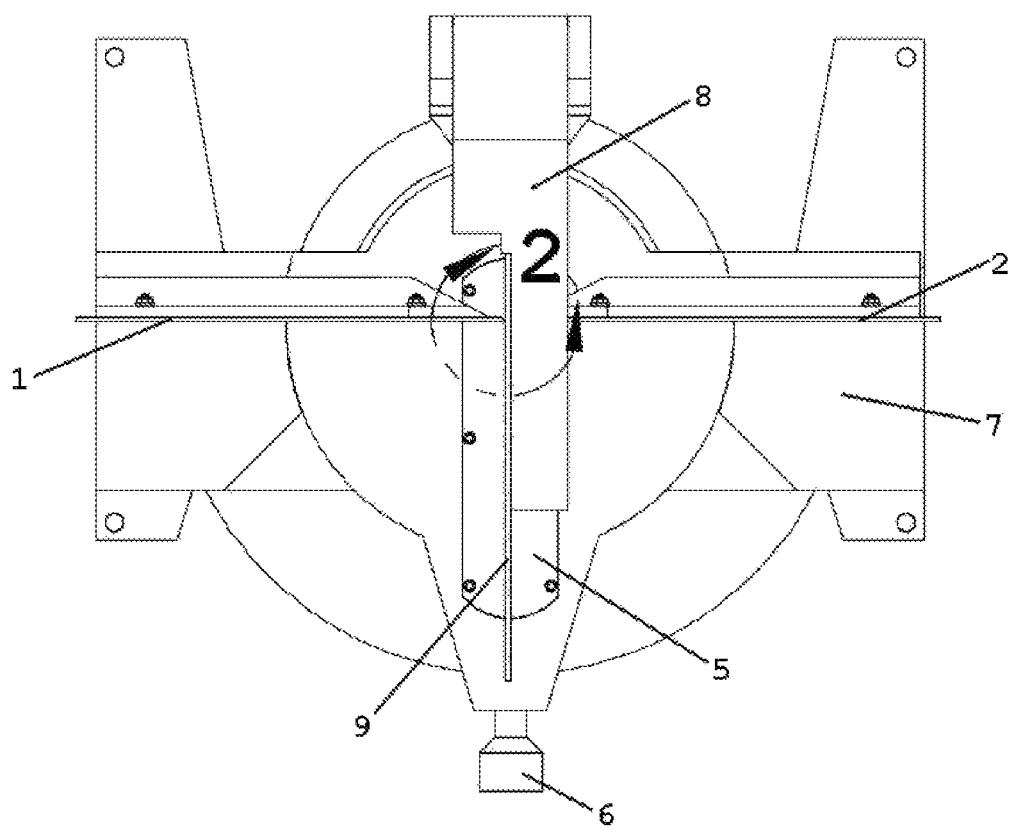
FIG. 12 is a top view of the present invention mounted on an existing chop saw in the down position.
Figure 13:
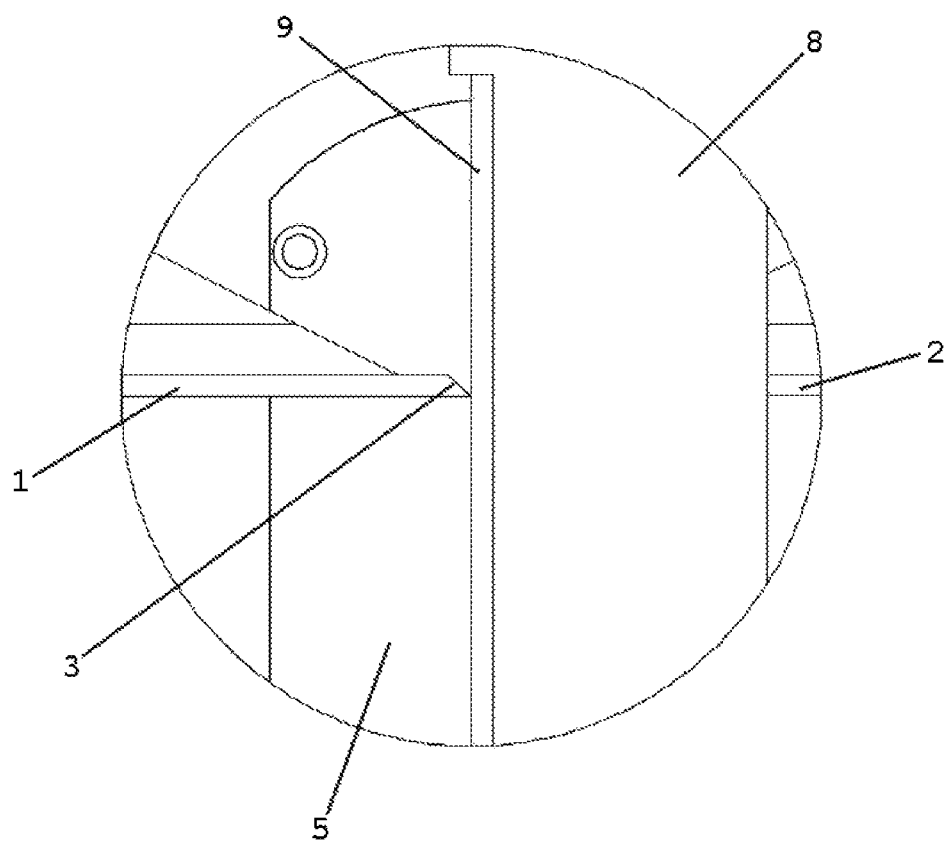
FIG. 13 is a magnified view taken from circle 2 of FIG. 12.
Figure 14:
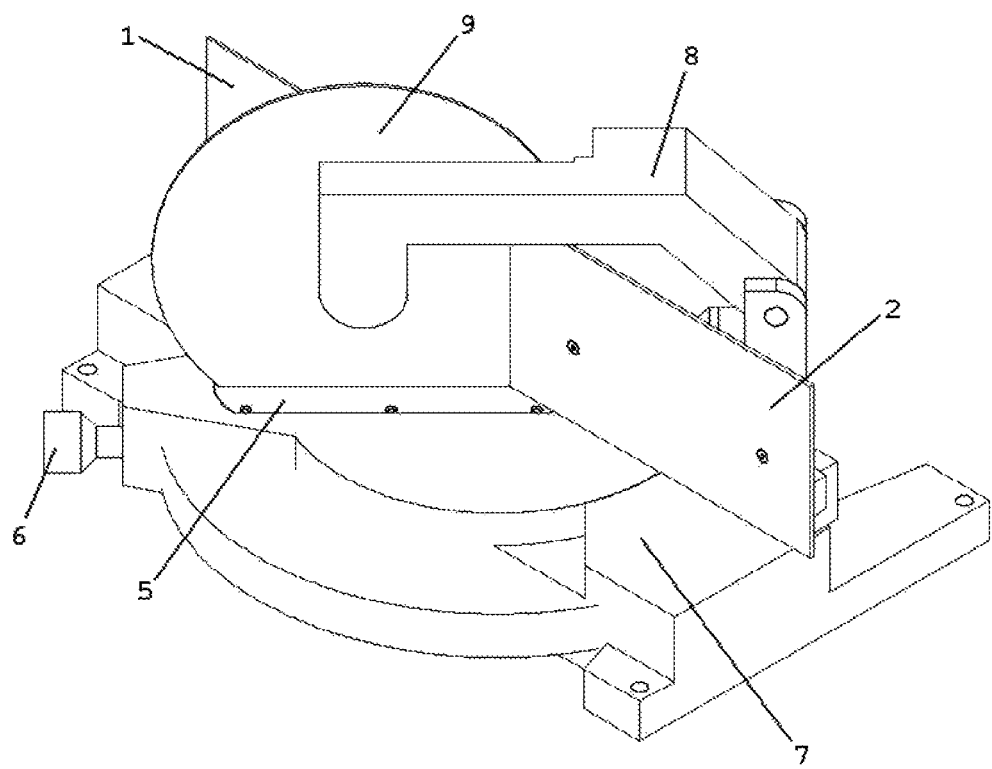
FIG. 14 is an upper perspective view of the present invention mounted on an existing chop saw in a left miter position.
Figure 15:
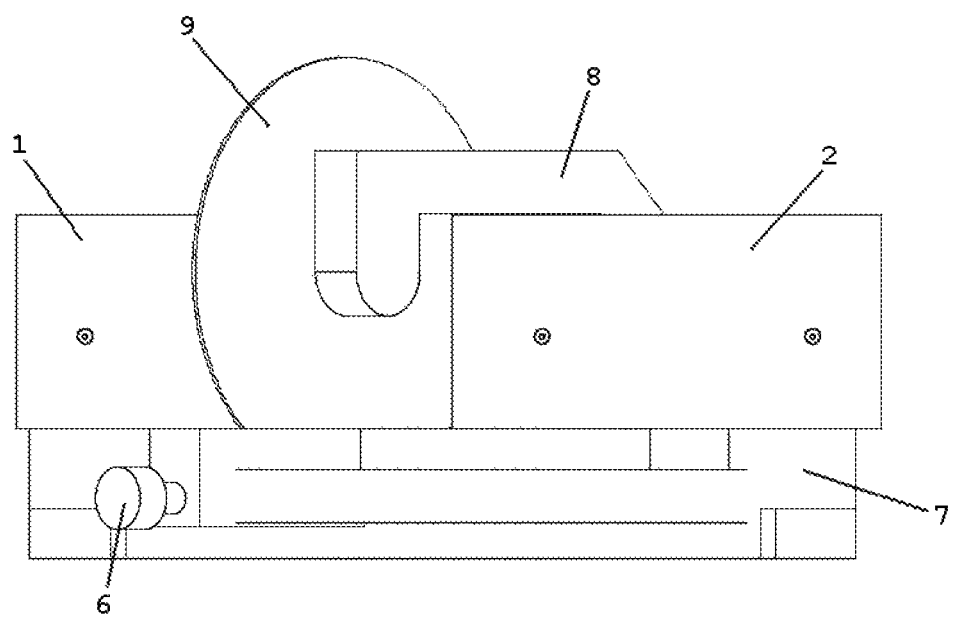
FIG. 15 is a front view of the present invention mounted on an existing chop saw in a left miter position.
Figure 16:
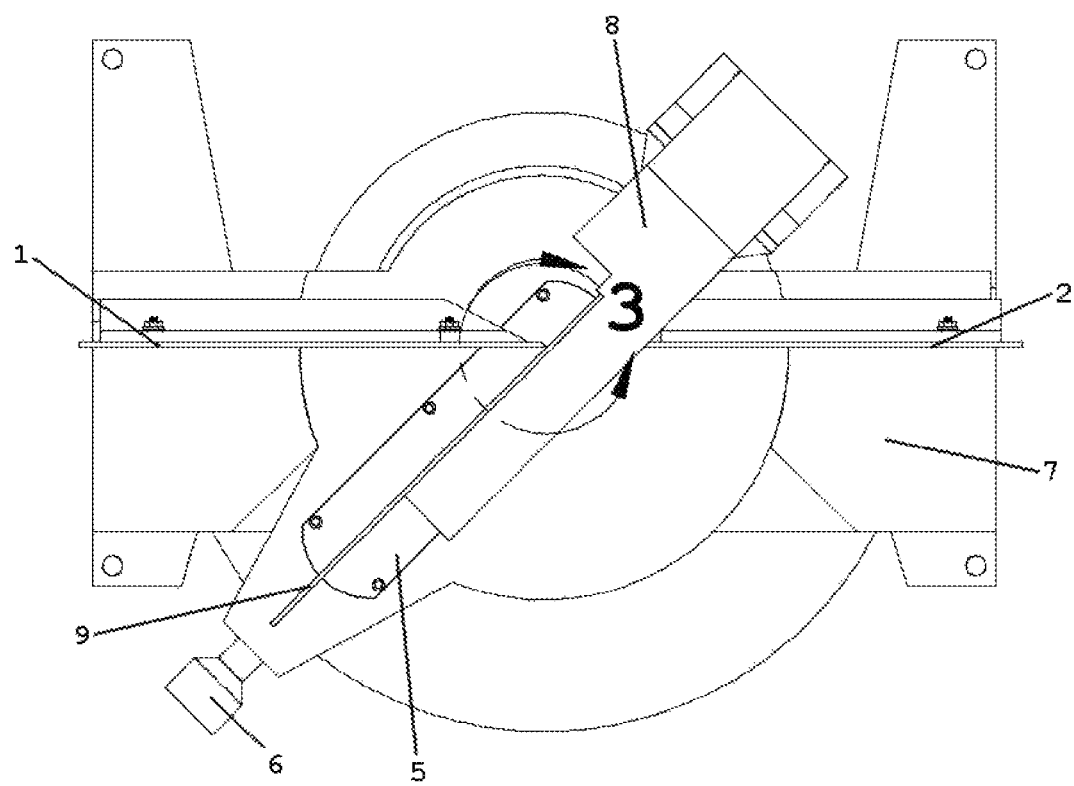
FIG. 16 is a top view of the present invention mounted on an existing chop saw in a left miter position.
Figure 17:
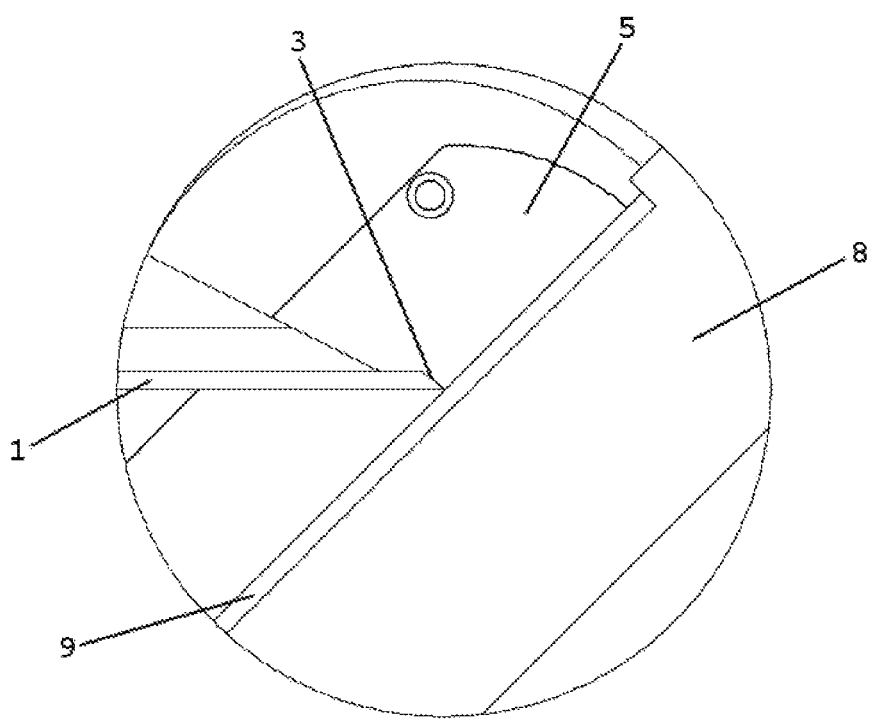
FIG. 17 is a magnified view taken from circle 3 of FIG. 16.
Figure 18:
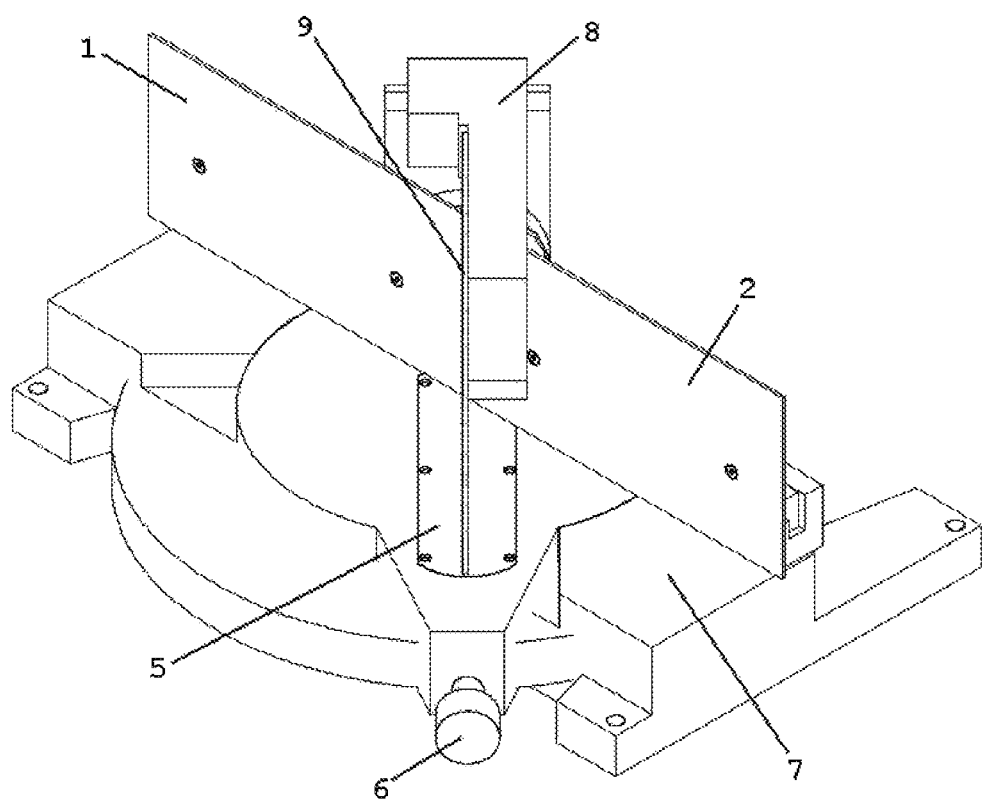
Figure 19:
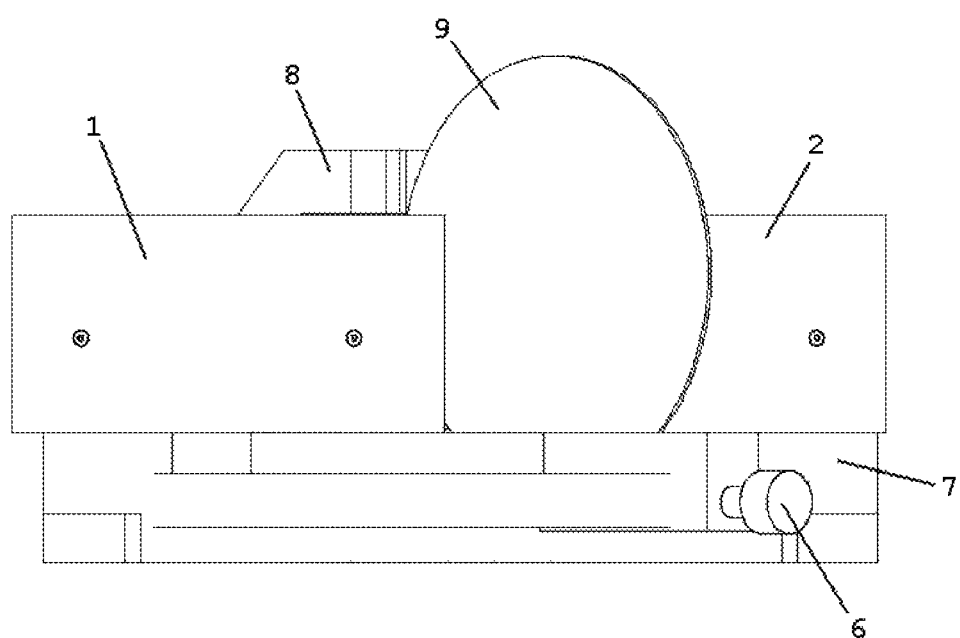
FIG. 19 is a front view of the present invention mounted on an existing chop saw in a right miter position.
Figure 20:
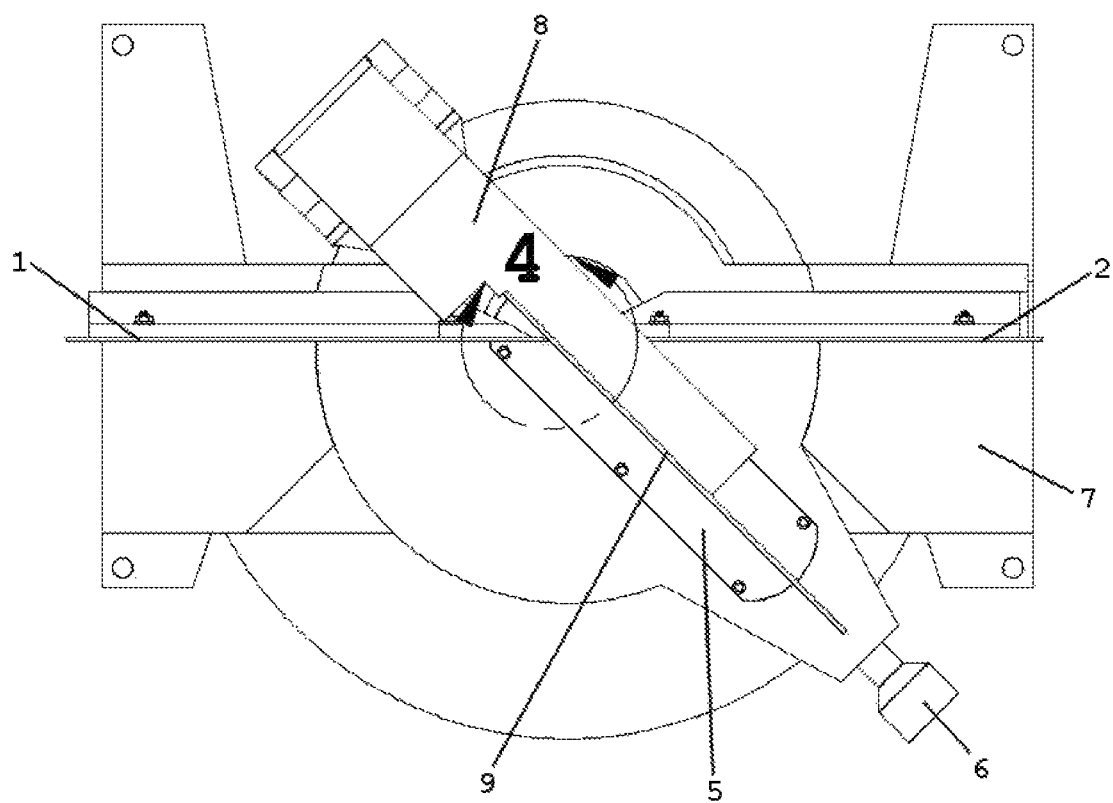
FIG. 20 is a top view of the present invention mounted on an existing chop saw in a right miter position.
Figure 21:
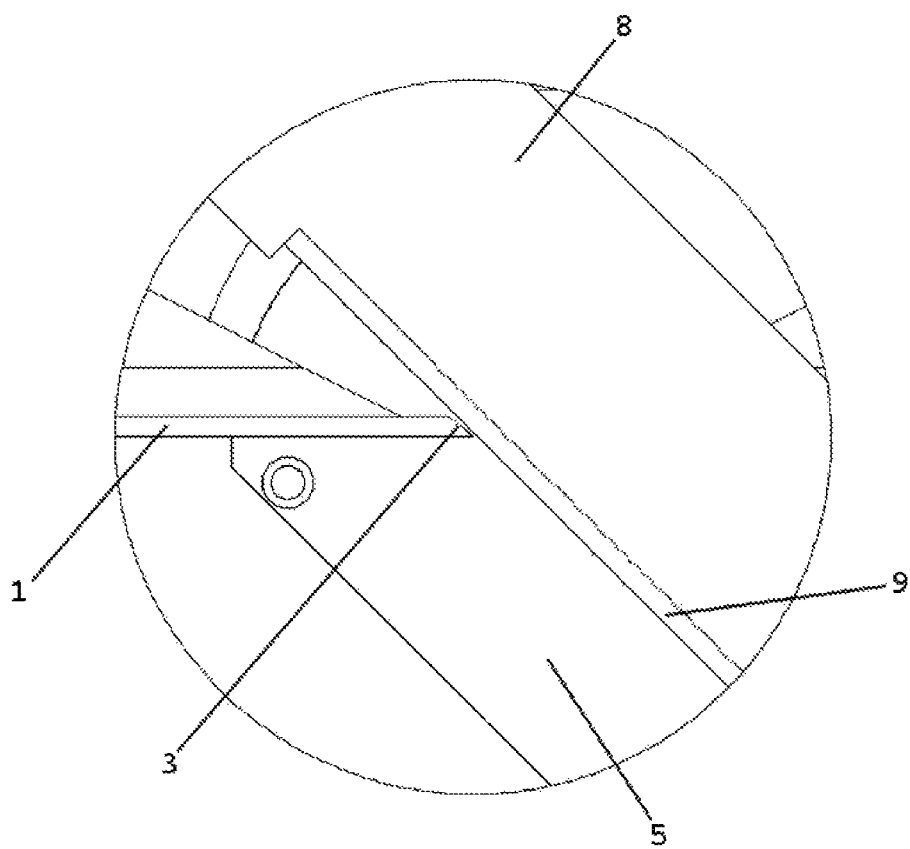
FIG. 21 is a magnified view taken from circle 4 of FIG. 20.

1. Left fence
2. Right fence
3. Beveled edge
5. Kerf insert
6. Miter angle selector
7. Saw table
8. Blade arm
9. Saw blade

DESCRIPTION OF THE PREFERRED EMBODIMENT

FIGS. 1 through 4 illustrate left and right fence extensions. The preferred embodiment of the present invention consists of a left fence extension 1, a right fence extension 2, each having a beveled edge 3. Left fence extension 1 and right fence extension 2 each have countersunk apertures dimensioned to accept a fastener securing the fence extensions to an existing chop saw fence. The countersunk apertures are positioned and dimensioned to align each fence extension to an aperture on a corresponding side of the existing chop saw fence. In the most preferred embodiment, the beveled edges 3 of each fence extension point toward each other with the beveled edges 3 facing the existing chop saw fence. When viewed from above as in FIG. 4, the beveled edges form a letter "V", with the point of the V facing the person using the chop saw fence, and the opening of the V facing the existing chop saw fence. Other fence extensions may orient the beveled edges in an upside-down letter V relative to the person using the chop saw fence. This allows the saw too much wiggle room left and right, when millimeters count. To ensure the most precise amount of saw blade space for any miter cut angle from the chop saw, it is essential that the beveled edges form a letter V pointing toward the person using the chop saw fence.

FIGS. 5 through 8 illustrate the inventive chop saw fence extensions mounted onto an existing chop saw fence. The existing chop saw has five main components: kerf insert 5, miter angle selector 6, saw table 7, blade arm 8, and saw blade 9. Kerf insert 5 allows the user to see the exact location of saw blade 9 at the bottom of the cut. Miter angle selector 6 controls the miter angle that saw blade 9 cuts at. This angle ranges from a 90-degree cut to a 45-degree cut in either direction. Saw table 7 provides a flat and level surface for a work piece to slide unhindered. Blade arm 3 attaches saw blade 9 to saw table 7 and pivots along a certain axis, allowing saw blade 9 to move downwards to make a cut.

FIGS. 9 through 13 illustrate the inventive chop saw fence extensions mounted onto an existing chop saw in a downward cutting position. It can be seen that the kerf insert 5 is a true indicator of where the saw blade 9 will end up. Left fence extension 1 and right fence extension 2 are nearly touching saw blade 9 because the point of the V created from beveled edges 3 just touch the very outside edge of the cut in kerf insert 5.

FIGS. 14 through 17 illustrate the inventive chop saw fence extensions mounted onto a chop saw in the downward cutting position for a left side 45-degree miter. It can be seen that left fence extension 1 has moved towards the center of saw table 7, and right fence extension 2 has moved away from the center of saw table 7. This is because when the miter angle changes, the blade has a different location of cutting. Kerf insert 5 rotates with saw blade 9, so it always shows the correct location that saw blade 9 will end up at. Left fence extension 1 and right fence extension 2 are set up so that the pointed parts of beveled edges 3 are lined up with the edge of the cut in kerf insert 5. This ensures that left fence 1 and right fence 2 are lined up with saw blade 9 as well.

FIGS. 18 through 21 illustrate the inventive chop saw fence extensions mounted onto a chop saw in the downward cutting position for a right side A 5-degree miter. The positioning of the fence is different for this side as well. Left fence extension 1 and right fence extension 2 are aligned with the very outer edges of the cut in kerf insert 5 and also the sides of saw blade 9.

Figure 22:
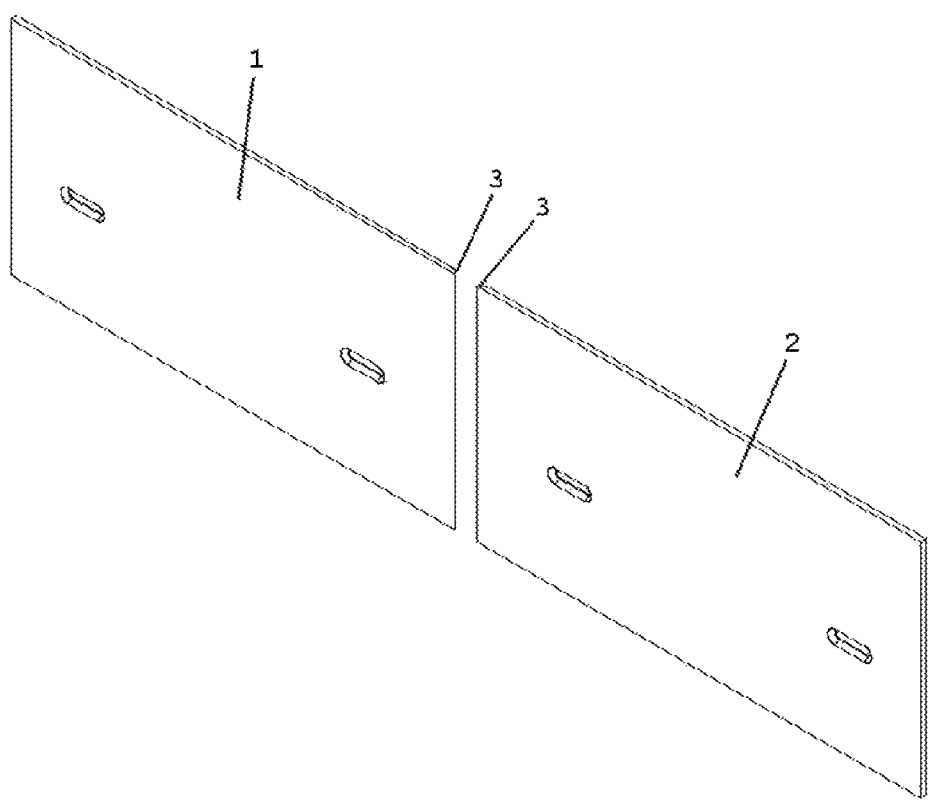
FIG. 22 is an upper perspective view of the present invention with slotted countersunk apertures.
Figure 23:
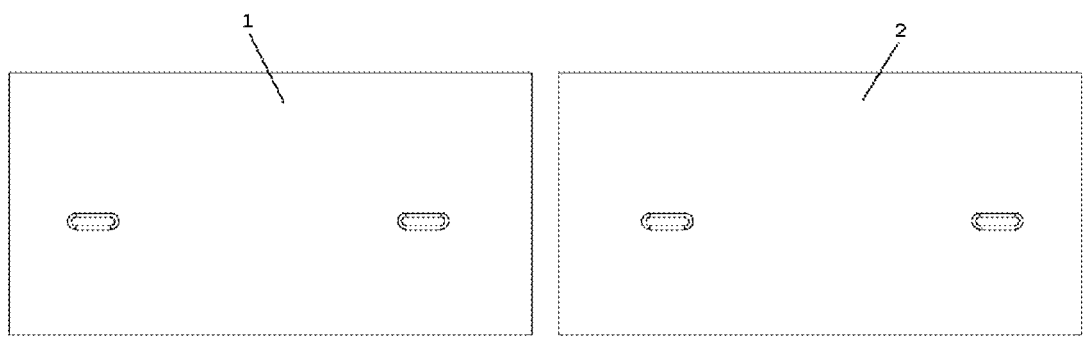
FIG. 23 is a front view of the present invention with slotted countersunk apertures.

FIGS. 22 through 23 illustrate the inventive chop saw fence extensions with slotted countersunk apertures. These would be used if an original chop saw fences do not move. In this embodiment, left fence extension 1 and right fence extension 2 need to be able to slide left and right independent of the original fences.

In use, the user would first mount left fence extension 1 and right fence extension 2 to the existing chop saw fences. Fasteners such as flat head bolts pass through both sets of apertures on both sets of fences to secure left fence extension 1 and right fence extension 2 to the existing chop saw fences. They are then able to slide left fence extension 1 and right fence extension 2 along the existing chop saw fences in order to change their position along saw table 7. The apertures are countersunk to allow a flat head bolt to sit flush with the surface of left fence extension 1 and right fence extension 2. This allows any work piece to slide past unhindered. The user must then decide what miter angle they are going to be cutting at. They select the desired angle with miter angle selector 6. At this point, they use the adjustment point on the existing chop saw fence to slide left fence extension 1 and right fence extension 2 so that their inside edge lines up with the outside edge of the cut in kerf insert 5. After the user checks that saw blade 9 will not hit either left fence extension 1 or right fence extension 2, the user can hook a tape measure onto either left fence extension 1 or right fence extension 2 to get a very precise measurement. The user can repeat this process for any miter angle.

Although embodiments and examples of the invention have been shown and described, it is to be understood that various modifications, substitutions, and rearrangements of parts, components, and/or process (method) steps, as well as other uses, shapes, construction, and design of this zero clearance fence can be made by those skilled in the art without departing from the novel spirit and scope of this invention.

I claim:

1. An auxiliary zero clearance fence for fastening flush against an existing chop saw fence, comprising:
    a rigid and flat left fence extension, having: one edge beveled to at least 45 degrees from a front surface of the rigid and flat left fence extension to a back surface of the rigid and flat left fence extension and a countersunk aperture positioned and dimensioned to align with and correspond to, an aperture in the existing chop saw fence;

a rigid and flat right fence extension, having: one edge beveled to at least 45 degrees from a front surface of the rigid and flat right fence extension to a back surface of the rigid and flat right fence extension and a countersunk aperture positioned and dimensioned to align with and correspond to, another aperture in the existing chop saw fence;

the rigid and flat left fence extension and the rigid and flat right fence extension independently movable to new locations on the existing chop saw fence such that when a cutting blade on a chop saw including the existing chop saw fence is selected to cut a desired miter angle between zero and forty-five degrees and the cutting blade is rotated to a new cutting angle and to a different cutting location of cutting on the chop saw, the beveled edge of the rigid and flat left fence extension and the beveled edge of rigid and flat right fence extension are precisely re-aligned to left and right edges of a kerf insert on the chop saw at the new cutting angle of the cutting blade to allow the cutting blade of the chop saw to avoid impacting the beveled edge of the rigid and flat left fence extension and the beveled edge of rigid and flat right fence extension and providing an indication of a precise position of the cutting blade, the beveled edge of the rigid and flat left fence extension and the beveled edge of the rigid and flat right fence extension precisely re-aligned to left and right edges of the kerf insert and the cutting blade further providing precise measurements of a material being cut on the chop saw at any desired miter angle between zero and forty-five degrees from either of the beveled edges each of the rigid and flat left fence extension and the rigid and flat right fence extension comprising a thin cross-section width to provide a deep visible cutting area of the cutting blade on the chop saw past each of the rigid and flat left fence extension and the rigid and flat right fence extension; and fasteners to secure each of the rigid and flat left fence extension and the rigid and flat right fence extension flush to the existing chop saw fence through the corresponding apertures, such that the beveled edges face each other and form a letter V with a point of the letter V facing forward from the auxiliary zero clearance fence and the existing chop saw fence.

2. The auxiliary zero clearance fence of claim 1, wherein each of the rigid and flat left and the rigid and flat right fence extensions comprise a smooth surface to allow the material to be cut to slide along unhindered along the rigid and flat left and the rigid and flat right fence extensions.

3. The auxiliary zero clearance fence of claim 1, further including a tape measure attachable to and removable from the beveled edge of the rigid and flat left fence extension providing precise measurement of the material to be cut from the left from the beveled edge of the rigid and flat left fence extension.

4. The auxiliary zero clearance fence of claim 1, further including a tape measure attachable to and removable from the beveled edge of the rigid and flat right fence extension providing precise measurement of the material to be cut from the right from the beveled edge of the rigid and flat right fence extension.

\* \* \* \* \*